Nov. 7, 1939.   J. S. PARSONS ET AL   2,179,346
ALTERNATING CURRENT APPARATUS
Filed July 31, 1937   2 Sheets-Sheet 1

WITNESSES:

INVENTORS
John S. Parsons and
George O. Harrison,
BY
ATTORNEY

Nov. 7, 1939.                 J. S. PARSONS ET AL                 2,179,346
                          ALTERNATING CURRENT APPARATUS
                      Filed July 31, 1937         2 Sheets-Sheet 2

WITNESSES:

INVENTORS
John S. Parsons and
George O. Harrison.
BY
ATTORNEY

UNITED STATES PATENT OFFICE 2,179,346

ALTERNATING CURRENT APPARATUS

John S. Parsons, Swissvale, and George O. Harrison, Wilkinsburg, Pa., assignors to Westinghouse Electric & Manufacturing Company, East Pittsburgh, Pa., a corporation of Pennsylvania Application July 31, 1937, Serial No. 156,778

28 Claims. (Cl. 175—294)

Our invention relates to alternating-current systems of transmission and distribution and particularly to such systems in which high-frequency apparatus is provided for controlling the circuit breakers of the system. In its more specific aspects, our invention relates to alternating-current network systems of distribution, in which a common network load circuit is supplied by means of a plurality of parallel-operated feeders, each connected to the load circuit through a plurality of stepdown network transformers.

In such network systems, the feeders are usually supplied from a common supply circuit, such as a station or substation bus, and individual feeder circuit breakers are provided for connecting the individual feeders to the bus. A number of network circuit breakers are associated with the various network transformers for controlling the power flow therethrough.

In order to provide simplified control equipment for such network circuit breakers, it has heretofore been proposed to control the open or closed condition of the network circuit breakers in accordance with the open or closed condition of the corresponding feeder circuit breaker by establishing a ground on one phase of the feeder at all times when the feeder circuit breaker is open. For this purpose, a grounding switch is provided as part of the equipment associated with each feeder breaker, and suitable apparatus responsive to a grounded feeder condition is provided as part of the control equipment for each network circuit breaker, so that the network circuit breaker will automatically open, in response to the grounded feeder condition, when the feeder circuit breaker is open. As examples of systems utilizing this expedient may be mentioned the system disclosed in our prior Patent No. 2,075,132, issued March 30, 1937, and the system disclosed in the copending sole application of J. S. Parsons, Serial No. 128,203, filed February 27, 1937, both assigned to Westinghouse Electric & Manufacturing Company.

In systems employing the expedient of grounding one feeder conductor when the feeder circuit breaker is open, a short-circuit condition will be established when the feeder breaker opens in response to a ground fault on a different feeder conductor, and for this reason, the switch which artificially establishes the ground must be sufficiently large and rugged to withstand the short-circuit current which traverses all of the network circuit breakers connected to the feeder for the time interval required for opening of the latter circuit breakers. Such a large switch and its accompanying heavy ground conductor cannot always be conveniently added to the station bus equipment. There is also some objection to the production of short-circuits in the station which cannot be cleared by the feeder circuit breaker.

It is, accordingly, an object of the present invention to provide a novel simplified alternating-current network system of the general type disclosed in the above mentioned patent and application, in which however, no substantial power flow to ground is established upon opening of any feeder circuit breaker.

A further object of our invention is to provide a novel simplified alternating-current network system in which carrier frequency apparatus is provided for causing the network circuit breakers to open when the feeder circuit breakers are open, and in which the carrier-responsive element of the network protectors is made sufficiently sensitive to respond to the natural high-frequency currents produced by an arc on the feeder, so that back-up protection is provided in the event that the carrier tripping signal is not transmitted to the protectors.

A further object of our invention is to provide an alternating-current network distribution system, of the carrier-current type, in which the network circuit breakers cannot be closed when any feeder conductors are transposed.

Other objects of our invention will become evident from the following detailed description taken in conjunction with the accompanying drawings, in which.

Figure 4:
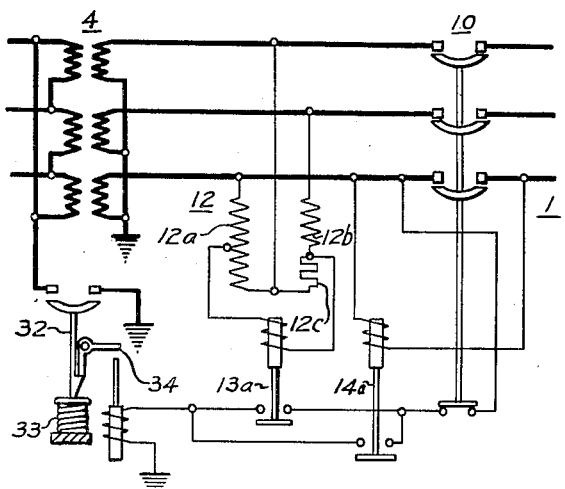

Fig. 4 is a diagrammatic view of group phasing apparatus which may be used in controlling the phasing operation of a number of feeder circuit breakers, in applying the present invention to a system of the type disclosed in our prior Patent No. 2,075,132, mentioned above; and, Fig. 5 is a diagrammatic view of the control apparatus for a single network circuit breaker, which may be provided in applying the present invention to a system of the type disclosed in our aforesaid prior patent.

Figure 1:
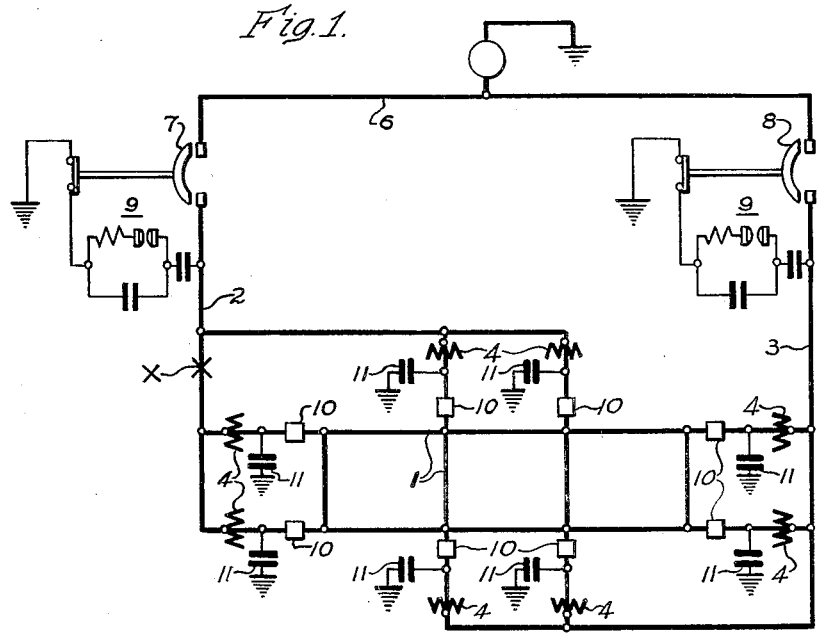
Figure 1 is a single-line diagrammatic view of an alternating current network system of distribution embodying our invention.

Referring to Figure 1 in detail, a common network load circuit 1 is supplied from a plurality of feeders 2 and 3, by means of a plurality of banks of transformers 4. The feeders 2 and 3 are arranged to be connected to a common alternating-current supply circuit 6, such as a station or substation bus, by means of suitable feeder circuit breakers 7 and 8 respectively. A network circuit breaker 10 is connected in the secondary leads of each transformer bank 4 for controlling the flow of power therethrough.

Each feeder breaker 7 and 8 is provided with a suitable carrier frequency source 9 for impressing high frequency currents upon the feeders 2 or 3, respectively, when the corresponding feeder breaker 7 or 8 is open. The carrier-frequency sources 9 may comprise any form of oscillator apparatus capable of producing carrier currents in the audio or radio frequency range, suitable for control of the network circuit breakers. Preferably, however, we utilize arc-oscillators energized directly from the feeders 2 and 3, respectively, in order to avoid the necessity of special voltage sources and switches for disconnecting the carrier source after all of the network circuit breakers have opened. It will be understood that the arc-oscillators 9 generate carrier currents when connected to the corresponding feeders 2 or 3 and are automatically deenergized without a switching operation, when the feeder becomes deenergized by the opening of the network circuit breakers 10. The arc-oscillators 9 are arranged to be connected to the respective feeders 2 and 3 by any suitable switching apparatus, shown for simplicity as back contacts of the feeder circuit breakers 7 and 8, respectively.

A capacitor 11 may be provided on the secondary side of each transformer bank 4, for shunting any high frequency currents which may pass the corresponding transformer bank 4, thereby preventing the circulation of carrier currents through the network load circuit 1. The inductive reactance of the transformers 4, of course, constitutes an impedance tending to selectively block the flow of high frequency currents, and in the majority of applications, the capacitors 11 may be omitted.

The arc-oscillators 9 are preferably tuned to individual frequencies for each of the feeders, such for example, as 50 kilocycles for one feeder and 60 kilocycles for another feeder, but may alternatively be all tuned to the same frequency. It will be understood that, although shown in Fig. 1 in single-line diagrammatic form, the various elements and circuits of this figure would ordinarily be polyphase.

Figure 2:
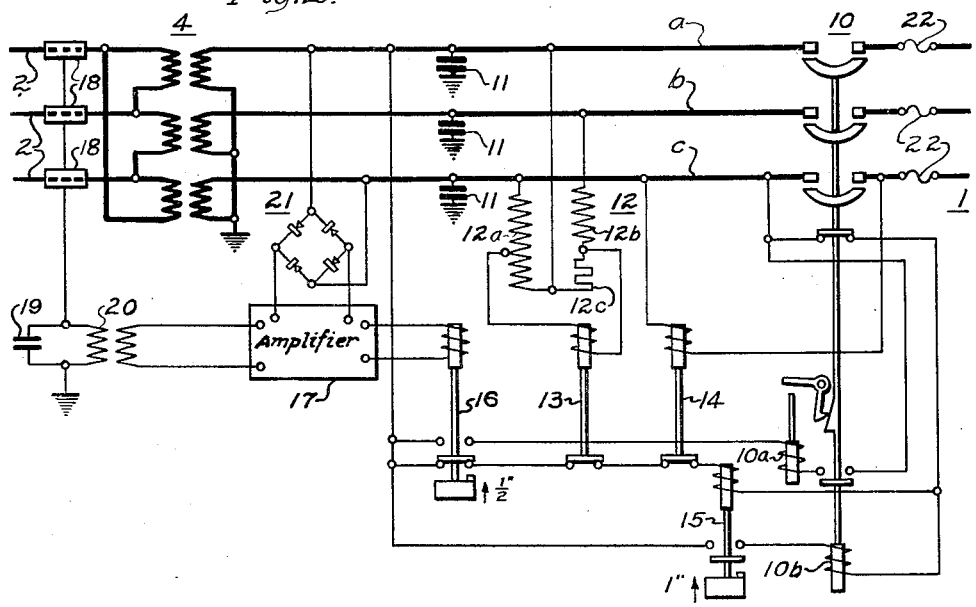
Fig. 2 is a diagrammatic view of the control apparatus of a single network circuit breaker used in the system shown in Fig. 1.

Referring now to Fig. 2 which shows the control equipment for a single network circuit breaker 10 of the system shown in Fig. 1, the feeder 2 is polyphase and is connected by means of the bank of step-down network transformers 4 to the network load circuit 1. The transformers 4 are preferably connected in delta on the high tension side and in star with neutral grounded on the low voltage network side.

The usual back-up fuses 22 are included between the network circuit breaker 10 and the network load circuit 1. The fuses 22 are designed to blow at a current value of the order of 200% or 300% rated full load current of the transformer bank 4, in accordance with the usual practice.

A negative sequence voltage filter 12 is connected on the low voltage side of the transformer bank 4 for energizing a negative sequence voltage relay 13 in the event that any two phases of the secondary voltage of the transformer bank 4 are transposed.

The negative sequence voltage filter 12 comprises an auto-transformer 12a having a 40% tap, a reactor 12b and a resistor 12c. The reactor 12b and resistor 12c are designed to have a combined lagging phase angle of 60°, and the resistance of the resistor 12c is so related to the total impedance of the reactor 12b and resistor 12c, that the voltage drop across the resistor 12c is equal to 40% of the total voltage impressed upon the reactor 12b and the resistor 12c in series. With the constants of the phase sequence filter 12 designed as indicated, and the terminals of the filter connected to the phase conductors in the order indicated by the reference characters a, b and c, the voltage appearing between the tap of the auto-transformer 12a and the junction of the reactor 12b and the resistor 12c, is proportional to the negative symmetrical components of the polyphase voltage applied to the filter terminals, as explained in the United States patent to B. E. Lenehan, No. 1,936,797, granted November 28, 1933, and assigned to the Westinghouse Electric & Manufacturing Company.

The negative sequence voltage relay 13 is designed to open its contacts when the negative sequence voltage impressed upon the terminal of the phase sequence filter 12 equals or exceeds a value of the order of 25% of the normal positive sequence secondary voltage of the transformer bank 4.

A voltage responsive relay 14 is provided for preventing the closure of the network circuit breaker 10 in the event that all three phases of secondary voltage of the transformer bank 4 are rotated 120° or 240°. For this purpose, the voltage responsive relay 14 is connected across one phase of the main contacts of the network circuit breaker 10, and is designed to pick up at a voltage of the order of 140% of the normal line-to-ground voltage of the secondary circuit of the transformer bank 4. The voltage responsive relay 14 is designed to drop out at some lower value of voltage, above normal value, such as 115% of the normal secondary line-to-ground voltage of the transformer bank 4.

A closing relay 15 is provided for initiating a closing operation of the network circuit breaker 10 when the feeder 2 is energized by voltage of approximately normal magnitude, and no crossed phase condition of the secondary voltage of the transformer bank 4 exists, as evidenced by the closed condition of the negative sequence voltage relay 13 and the voltage responsive relay 14.

The closing relay 15 is designed to close at a voltage value of the order of 90% of the normal line-to-line secondary voltage of the transformer bank 4, and to drop out at some lower value such as 70%. The voltage responsive relay 15, and similar relays of other network protectors, are preferably delayed in closing a sufficient length of time to insure that each network circuit breaker associated with the feeder 2 remains in open condition, after opening, until the remaining network circuit breakers of feeder 2 open, so as to ensure the complete clearing of the feeder 2 following the opening of the feeder circuit breaker. The time delay of relay 15 may be secured by any suitable expedient known in the art. A dashpot is shown to indicate the delay, which may be of the order of 1 second.

An arc frequency time delay relay 16 is provided for selectively completing a circuit for the closing relay 15 or for the trip coil 10a of the circuit breaker 10, depending upon the absence or presence of arc frequency currents upon the feeder 2. The arc frequency relay 16 may be of any suitable time delay type, such as to introduce a time delay of the order of ½ second after energization of its operating coil before it opens the circuit of the closing relay 15 and completes the circuit of trip coil 10a.

The arc frequency relay 16 is energized by means of a suitable electronic amplifier 17, the input circuit of which is connected to the phase conductors of the feeder 2 by means of a plurality of coupling capacitors 18, and a tuned coupling circuit shown as comprising a capacitor 19 and an inductive coupling device 20. The coupling capacitors 18, which serve as an antenna to receive the carrier signal, may comprise simple tubular conductors surrounding each incoming lead of the transformer bank 4, or may comprise a tubular conductor surrounding the entire feeder cable. Obviously other forms of antennae may be used, the requirement being simply to pick up the carrier signal from the feeder 2.

The electronic amplifier 17 is designed to introduce sufficient amplification to insure operation of the arc-frequency time-delay relay 16 in response to high-frequency currents produced by a fault arc as well as the carrier signals produced by the arc-oscillator 9 associated with the feeder 2. The amplifier 17 may be energized from any suitable source, preferably from the low-voltage leads of the transformer bank 4 by means of a suitable rectifier 21.

The capacitors 11 for shunting arc frequency currents arising in the feeder 2 from the network 1, are provided on each secondary phase of the transformer bank 4, and are preferably connected in star to ground. As indicated above, these capacitors are unnecessary for the average installation.

The operation of the apparatus shown in Figs. 1 and 2 may be set forth as follows: With the feeder circuit breakers 7 and 8 both open as shown, and the network circuit breakers 10 all open, the network circuit breakers 10, connected to the feeder 2, may be closed by closing the feeder circuit breaker 7.

Upon closure of the feeder circuit breaker 7, the feeder 2 is energized by voltage of normal magnitude and phase relationship, and secondary voltages of normal phase sequence and magnitude appear across the secondary terminals of the transformer bank 4. It will be understood that the polyphase bus (not shown) which supplies feeder 2 has its neutral point grounded, in accordance with the usual practice.

As the phase sequence of the polyphase secondary voltage of the transformer bank 4 is normal, its negative sequence component is approximately zero, and the negative sequence relay 13, accordingly, remains closed. The voltage responsive relay 14 is energized by a voltage of the order of 100% of the normal line-to-ground voltage of the network load circuit 1, which voltage is insufficient to effect opening of the relay 14, and the latter relay accordingly remains closed. As back contacts of both the relays 13 and 14 remain closed, a closing circuit for the voltage responsive relay 15 is completed through back contacts of the arc frequency relay 16, back contacts of the phase sequence relay 13, and back contacts of the voltage responsive relay 14. The timing operation of the closing relay 15 accordingly commences, and at the expiration of its time delay of 1 second, the relay 15 completes a circuit for the closing solenoid 10b of the circuit breaker 10, and the latter circuit breaker operates to closed position. The remaining network circuit breakers 10 connected to the feeder 2 (Fig. 1), are similarly operated to closed position, and power is supplied from the feeder 2 to the network load circuit 1. The feeder 3 is similarly brought into operation by closure of the feeder circuit breaker 8. It will be understood that normally the load of the work would be supplied by a number of different feeders, of which the feeders 2 and 3 are merely illustrative.

If a fault occurs on the network load circuit 1, power is supplied through any connected feeders such as 2 and 3, to the fault, and the latter is burned off in the usual manner.

If a fault occurs on the feeder 2, as indicated at X, the direction of power flow through the network circuit breakers 10 reverses, and power is supplied to the fault in reverse direction. The protective relay apparatus (not shown) associated with the feeder circuit breaker 7 for detecting and clearing feeder faults, operates under these conditions to effect opening of the feeder circuit breaker 7 in a time interval of the order of 10 to 15 cycles of the alternating current supply.

Upon opening of the feeder circuit breaker 7 voltage is impressed upon the arc-oscillator 9 of the feeder 2, and the latter arc-oscillator generates carrier frequency signal currents which are impressed upon the feeder 2 and transmitted over the feeder 2 to the various network circuit breakers 10 supplied from the latter.

Referring to Fig. 2, the carrier frequency currents supplied to the feeder 2 are picked up by the coupling capacitor 18 and amplified by the amplifier 17, a resultant current flow appearing in the arc frequency relay 16, which current flow effects operation of the latter relay at the expiration of its time delay or ½ second.

At the expiration of its time delay, the arc-frequency relay 16 completes a circuit for the trip coil 10a of the network circuit breaker 10, and opens its back contacts in the circuit of the closing relay 15.

In response to energization of its trip coil 10a, the network circuit breaker 10 operates to open position, thereby disconnecting the transformer bank 4 from the network load circuit 1. Returning to Fig. 1, the various network circuit breakers 10 supplied from the feeder 2 all operate in the manner described, to disconnect the feeder 2 from the network load circuit entirely. When the last network circuit breaker 10 has opened, voltage is no longer available to energize the arc-oscillator 9, and the oscillations produced by the latter source are interrupted.

The feeder circuit breaker 7 may now be reclosed, and if the fault on the feeder 2, still exists, the feeder circuit breaker 7 will immediately open because of operation of its protective relays (not shown). As the time required for opening of the circuit breaker 7 is much less than the time required for closure of any of the network circuit breakers 10, none of the latter circuit breakers will be reclosed while the fault exists.

Assuming that the fault on feeder 2 is of such nature as to require feeder repairs, and that in repairing the feeder cable, the workmen have accidentally transposed two of the feeder conductors, the operation will be as follows: Upon reclosure of the feeder breaker 7, no short circuit path exists, and the feeder breaker remains closed. At one or more of the network circuit breakers 10, however, depending upon the location of the fault on the feeder, a negative sequence voltage appears at the transformer secondary terminals, and the corresponding negative sequence relay 13 operates to open position, thereby preventing closure of the corresponding network circuit breaker.

If, in repairing the feeder fault, the workmen accidentally rotate all three conductors on the load side as compared with the part of the feeder adjacent the fault on the supply side, the voltage appearing at the secondary terminals of each of the transformer banks 4 is of normal magnitude and phase sequence, and the corresponding negative phase sequence relays 13 remain closed. The voltage responsive relays 14, however, are subjected to a voltage of the order of 173% of the normal secondary line-to-ground voltage of the network load circuit 1, under these conditions, and accordingly, operate to open position, thereby preventing the closure of such network circuit breakers 10 as may be energized from the feeder 2 beyond its point of incorrect connection. It will be seen that the relays 13 and 14 together prevent any network circuit breakers 10 from closing when the polyphase voltage appearing on the feeder side of the network circuit breaker is of incorrect phase relationship because of transposition of any feeder conductors.

Returning to Fig. 1, it will be noted that a fault at X on feeder 2, occurring when the feeder circuit breakers 7 and 8 are closed, will produce natural arc high-frequency oscillations which circulate through the bus 6, out over the feeder 3, which is not faulted, to the carrier responsive devices connected to the unfaulted feeder 3. In order to prevent opening of the network circuit breakers 10 associated with the unfaulted feeder 3 under these conditions, the tripping time of the latter network circuit breakers is made greater than that of the feeder circuit breaker 7 which controls feeder 2. Similarly, the tripping time of the network circuit breakers 10 supplied from feeder 2 is made greater than that of the feeder circuit breaker 8 which controls feeder 3. Practically, this time delay relationship can be secured by delaying the tripping of all of the network circuit breakers 10 for a uniform time interval greater than the time required for tripping of any of the feeder circuit breakers, such as 7 and 8.

Figure 3:
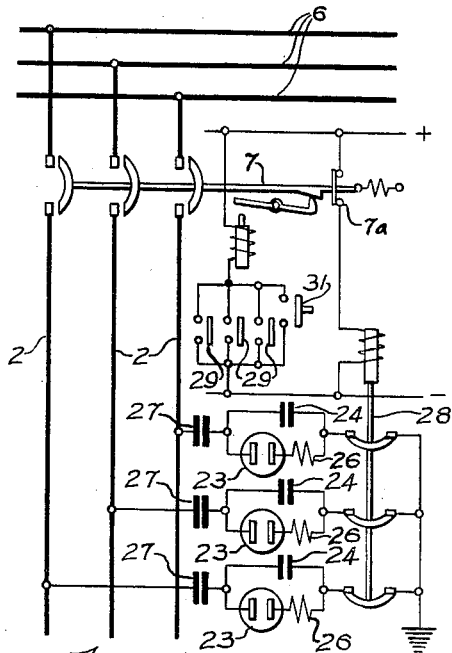
Fig. 3 is a diagrammatic view of the apparatus for impressing high frequency currents upon the feeder when the feeder circuit breaker is open.

Although shown diagrammatically in Fig. 1 as a single phase device, each arc-oscillator 9 preferably comprises three separate oscillator circuits, as shown in Fig. 3. Referring to the latter figure, each oscillator circuit comprises a gaseous-type electric discharge device 23, which may be a simple gap open to the atmosphere or may be an enclosed gas-filled diode, which is connected in an oscillatory circuit comprising a capacitor 24 and an inductance 26, such as a tuning coil. The three oscillator circuits are connected to the conductors of the feeder 2 by suitable coupling devices 27, preferably capacitors, and an electromagnetic switch 28 is provided for connecting the three oscillator circuits to ground.

The switch 28 is controlled by auxiliary contacts 7a of the feeder circuit breaker 7, in such manner as to close when the latter circuit breaker opens. The contacts of suitable feeder breaker relays are indicated at 29, but the relays, for simplicity, are not shown in their entirety. A push-button switch 31 is provided for manually opening the feeder circuit breaker 7 and closing the electromagnetic switch 28.

The reactance of the coupling capacitors 27 is so related to the reactance of the capacitors 24 as to impress a voltage well above the breakdown voltage of the electric discharge devices 23 upon the latter, when the feeder 2 is energized and the electromagnetic switch 28 is closed. The break-down voltage of the electric discharge devices 23 may range from a low value for gas filled devices up to a thousand volts or more for open gaps, depending upon the type of device selected.

The three oscillator circuits of the arc-oscillator 9 are tuned to slightly different frequencies, such as 49, 50 and 51 kilocycles, to avoid interference dead spots and to insure heterodyne beats of relatively high frequency.

The arrangement of three separate oscillator circuits connected between the feeder conductors and ground insures passage of the carrier signal past practically all of feeder fault conditions encountered in practice. This arrangement also prevents the development of excessive voltages to ground (173% normal) as encountered when one feeder conductor is grounded.

Figure 5:
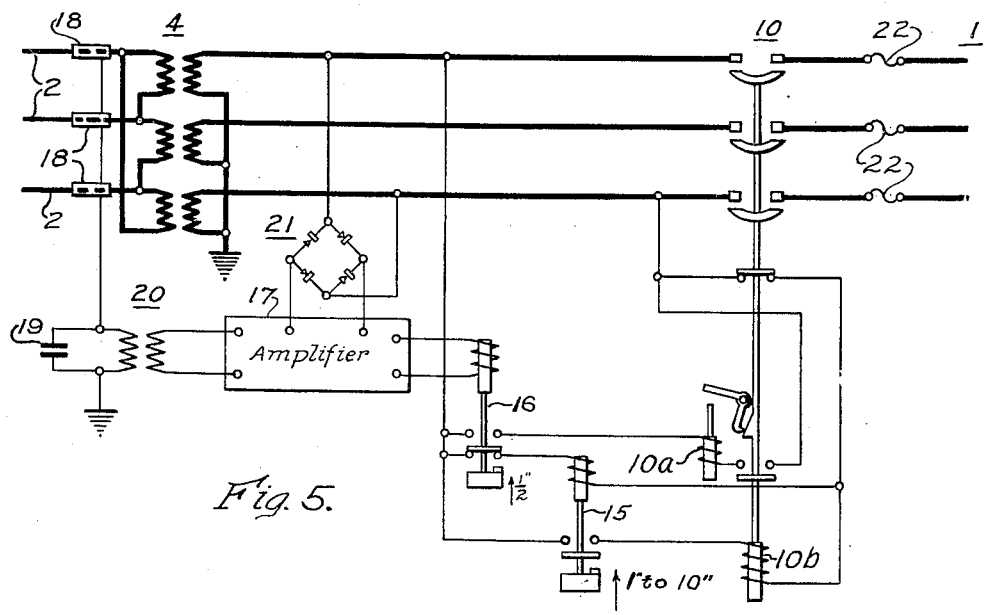

Figs. 4 and 5 illustrate a modification of the invention utilizing group phasing as disclosed in our prior Patent No. 2,075,132, mentioned above. Referring to Fig. 4, a grounding switch 32 is provided at one or two points on each feeder for grounding the feeder in the event of transposed feeder conductors. The grounding switch 32 is biased to close position by means of a spring 33 but is normally held open by means of an electromagnetically released latch 34. A negative sequence relay 13a and a voltage-responsive relay 14a, similar to the elements 13 and 14 of Fig. 1, respectively, but having front contacts instead of back contacts, are provided for tripping the gronding switch 32 in the event of transposed feeder conductors.

If any feeder conductors have been transposed in repairing of feeder fault, one or the other of relays 13a or 14a will trip the grounding switch 32, upon subsequent energization of the feeder by closure of the feeder breaker, thereby causing the feeder to be solidly grounded and the feeder circuit breaker to trip open. Because of their time delay in closing, none of the network circuit breakers can close before the feeder is permanently grounded by the grounding switch 32. It will be noted that the operation of the grounding switch 32 does not cause any short-circuit current to flow which cannot be interrupted by the feeder circuit breaker.

Where group phasing devices such as shown in Fig. 4 are used, the control apparatus for the network circuit breakers may be simplified as indicated in Fig. 5. In this figure the various elements are similar to the elements of Fig. 2 of corresponding designation.

It will be apparent that with either of the network circuit breaker control circuits shown and described in connection with Figs. 2 or 5, if the carrier tripping signal for any reason fails to reach any network circuit breaker following a fault on the corresponding feeder, the closed protector will maintain voltage on the feeder, causing natural arc oscillations at the fault which will cause the closed network circuit breaker to trip.

We do not intend that the present invention shall be restricted to the specific structural detail arrangement of parts or circuit connections herein set forth, as various modifications thereof may be effected without departing from the spirit and scope of our invention. We desire, therefore, that only such limitations shall be imposed as are indicated in the appended claims.

We claim as our invention:

1. In an alternating-current distribution system of the network type, a polyphase network load circuit; a polyphase power frequency source; a polphase feeder for suuplying power from said source to said load circuit; a transformer connecting said feeder to said load circuit; a network circuit breaker for controlling the power flow through said transformer; means for selectively impressing carrier currents on said feeder; and means responsive to a predetermined carrier-frequency energy condition of said feeder, effective only when said feeder is energized by a polyphase system of voltages of normal phase relationship, for causing said network circuit breaker to close.

2. In an alternating-current distribution system of the network type, a polyphase network load circuit; a polyphase power frequency source; a polyphase feeder for supplying power from said source to said load circuit; a transformer connecting said feeder to said load circuit; a network circuit breaker for controlling the power flow through said transformer; means for selectively impressing carrier currents on said feeder; closing means responsive to a predetermined carrier-frequency energy condition of said feeder and responsive to energization of said feeder by power-frequency voltage for causing said network circuit breaker to close; and means responsive to transposition of conductors of said feeder for preventing operation of said closing means.

3. In an alternating-current distribution system of the network type, a polyphase network load circuit; a polyphase power frequency source; a polyphase feeder for supplying power from said source to said load circuit; a transformer connecting said feeder to said load circuit; a network circuit breaker for controlling the power flow through said transformer; means for selectively impressing carrier currents on said feeder; closing means responsive to a predetermined carrier-frequency energy condition of said feeder and responsive to energization of said feeder by power frequency voltage for causing said network circuit breaker to close; and means responsive to an abnormal relationship of voltages of said feeder and load circuit for preventing operation of said closing means.

4. In an alternating-current distribution system of the network type, a polyphase network load circuit; a polyphase power frequency source; a polyphase feeder for supplying power from said source to said load circuit; a plurality of transformers connecting said feeder to said load circuit; a plurality of network circuit breakers for controlling the power flow through said transformers; means for selectively impressing carrier currents on said feeder; and control means for each of said network circuit breakers, each of said control means including means responsive to a predetermined carrier frequency energy condition of said feeder, effective only when said feeder is energized by a polyphase system of voltages of normal phase relationship, for causing said network circuit breaker to close.

5. In an alternating-current distribution system of the network type, a polyphase network load circuit; a polyphase power frequency source; a polyphase feeder for supplying power from said source to said load circuit; a plurality of transformers connecting said feeder to said load circuit; a plurality of network circuit breakers for controlling the power flow through said transformers; means for selectively impressing carrier currents on said feeder; and control means for each of said network circuit breakers; each of said control means including closing means responsive to a predetermined carrier-frequency energy condition of said feeder and responsive to energization of said feeder by power frequency voltage for causing said network circuit breaker to close, and means responsive to transposition of conductors of said feeder for preventing operation of said closing means.

6. In an alternating-current distribution system of the network type, a polyphase network load circuit; a polyphase power frequency source; a polyphase feeder for supplying power from said source to said load circuit; a plurality of transformers connecting said feeder to said load circuit; a plurality of network circuit breakers for controlling the power flow through said transformers; means for selectively impressing carrier currents on said feeder; and control means for each of said network circuit breakers, each of said control means including closing means responsive to a predetermined carrier-frequency energy condition of said feeder and responsive to energization of said feeder by power frequency voltage for causing said network circuit breaker to close, and means responsive to an abnormal relationship of voltages of said feeder and load circuit for preventing operation of said closing means.

7. In an alternating-current distribution system of the network type, a network load circuit; a power frequency source; a feeder for supplying power from said source to said load circuit; a network circuit breaker for connecting said feeder to said load circuit; tripping means for said network circuit breaker; reclosing means for said network circuit breaker responsive to predetermined conditions including a predetermined voltage condition of said feeder; and means responsive to a high-frequency current condition produced by an arc on said feeder for effecting operation of said tripping means and for preventing operation of said reclosing means.

8. In an alternating-current distribution system of the network type, a network load circuit; a power frequency source; a feeder for supplying power from said source to said load circuit; a plurality of network circuit breakers for connecting said feeder to said load circuit; tripping means for each of said network circuit breakers; reclosing means for each of said network circuit breakers responsive to predetermined conditions including a predetermined voltage condition of said feeder; means responsive to a high frequency current condition produced by an arc on said feeder for effecting operation of each of said tripping means, and time delay means for retarding operation of each of said reclosing means for a sufficient interval to insure opening of all of said network circuit breakers in the event of a fault on said feeder before reclosure of any of said network circuit breakers.

9. In an alternating-current system of transmission and distribution, a power circuit; a pair of parallel-operated circuits; an individual circuit breaker for connecting each of said parallel-operated circuits to said power circuit; an additional circuit breaker connected to each of said parallel-operated circuits remote from said power circuit; individual tripping means for said individual circuit breakers, each of said individual tripping means being selectively effective to trip the corresponding individual circuit breaker in response to a fault on the corresponding parallel-operated circuit; and high-frequency tripping means for each of said additional circuit breakers, each of said high-frequency tripping means being responsive to a high-frequency current condition produced by an arc on the corresponding parallel-operated circuit and being effective to trip the corresponding additional circuit breaker only after a time interval greater than the time required for operation of the individual circuit breaker of the other of said parallel-operated circuits, whereby operation of either of said high-frequency tripping means in response to high frequency energy produced on the other of said parallel circuits is prevented.

10. In an alternating-current system of distribution, a supply circuit; a plurality of feeders; a feeder circuit breaker for connecting each of said feeders to said supply circuit; a load circuit breaker connected to each of said feeders; feeder fault-responsive means for selectively tripping each of said feeder circuit breakers within a predetermined time interval in response to fault on the corresponding feeder; and high-frequency tripping means for each of said load circuit breakers; each of said high-frequency tripping means being responsive to a high-frequency current condition produced by an arc on the corresponding feeder and being effective to trip the corresponding load circuit breaker only after a time delay greater than said predetermined time interval.

11. In an alternating-current network system of distribution, a network load circuit; a supply circuit; a plurality of feeders for supplying power from said supply circuit to said load circuit; a feeder circuit breaker for connecting each of said feeders to said supply circuit; a plurality of transformers connecting said feeders to said load circuit; a plurality of network circuit breakers for controlling the power flow through said transformers; feeder fault responsive means for selectively tripping each of said feeder circuit breakers within a predetermined time interval in response to a fault on the corresponding feeder; and high-frequency tripping means connected to the high-voltage sides of said transformers for controlling the associated network circuit breakers, each of said high-frequency tripping means being selectively responsive to a high-frequency current condition produced by an arc on the corresponding feeder and being effective to trip the corresponding network circuit breaker only after a time delay greater than said predetermined time interval.

12. In a system of transmission and distribution, a power circuit; a circuit breaker connected to said power circuit; tripping means responsive to a high-frequency current condition generated by a fault arc on said circuit for causing said circuit breaker to open; and control means operable irrespective of the faulted or unfaulted condition of said circuit to establish a high-frequency current condition on said circuit such as to cause operation of said tripping means.

13. In a system of transmission and distribution, a power circuit; a circuit breaker connected to said power circuit; tripping means responsive to a high-frequency current condition produced by an arc on said circuit for causing said circuit breaker to open; and control means selectively operable to establish an arc on said circuit such as to cause operation of said tripping means.

14. In a system of transmission and distribution, a power circuit; a circuit breaker connected to said power circuit; tripping means responsive to a predetermined band of high-frequency currents generated by a fault arc on said circuit for causing said circuit breaker to open; and control means operable irrespective of the faulted or unfaulted condition of said circuit to produce high frequency currents on said circuit of frequency within said band.

15. In a system of transmission and distribution, a power circuit; a circuit breaker connected to said power circuit; tripping means responsive to a predetermined band of high-frequency currents produced by an arc on said circuit for causing said circuit breaker to open; an arc-oscillator tuned to a frequency within said band; and means selectively operable to connect said arc-oscillator to said circuit.

16. In an alternating-current network system of distribution, a network load circuit; a supply circuit located at a supply station; a feeder for supplying power from said supply circuit to said load circuit; a transformer connecting said feeder to said load circuit; a network circuit breaker for controlling the power flow through said transformer; tripping means responsive to a high-frequency current condition generated by a fault arc on said feeder for causing said network circuit breaker to open; and control means at said supply station operable to establish a high-frequency current condition on said feeder such as to cause operation of said tripping means.

17. In an alternating-current network system of distribution, a network load circuit; a supply circuit located at a supply station; a feeder for supplying power from said supply circuit to said load circuit; a transformer connecting said feeder to said load circuit; a network circuit breaker for controlling the power flow through said transformer; tripping means responsive to a predetermined band of high-frequency currents generated by a fault arc on said feeder for causing said network circuit breaker to open; and control means at said supply station operable to produce high-frequency currents on said feeder of frequency within said band.

18. In an alternating-current network system of distribution, a network load circuit; a supply circuit located at a supply station; a feeder for supplying power from said supply circuit to said load circuit; a transformer connecting said feeder to said load circuit; a network circuit breaker for controlling the power flow through said transformer; tripping means responsive to a predetermined band of high-frequency currents produced by an arc on said feeder for causing said network circuit breaker to open; an arc-oscillator at said supply station tuned to a frequency within said band; and means selectively operable to connect said arc-oscillator to said feeder.

19. In an alternating-current distribution system of the network type, a polyphase network load circuit; a polyphase power frequency source; a polyphase feeder for supplying power from said source to said load circuit; a plurality of transformers connecting said feeder to said load circuit; a plurality of network circuit breakers for controlling the power flow through said transformers; means for selectively impressing carrier currents on said feeder; individual control means for said network circuit breakers, each of said control means including closing means responsive to a predetermined carrier-frequency energy condition of said feeder and responsive to energization of said feeder by power frequency voltage for causing the corresponding network circuit breaker to close; and group phasing means responsive to transportation of conductors of said feeder for preventing operation of all of said closing means.

20. In an alternating-current distribution system of the network type, a polyphase network load circuit; a polyphase power frequency source; a polyphase feeder for supplying power from said source to said load circuit; a plurality of transformers connecting said feeder to said load circuit; a plurality of network circuit breakers for controlling the power flow through said transformers; means for selectively impressing carrier currents on said feeder; individual control means for said network circuit breakers, each of said control means including closing means responsive to a predetermined carrier-frequency energy condition of said feeder and responsive to energization of said feeder by power frequency voltage for causing the corresponding network circuit breaker to close; and group phasing means responsive to an abnormal relationship of voltages of said feeder and load circuits for preventing operation of all of said closing means.

21. In an alternating-current system of transmission and distribution, a load circuit; a supply circuit; a plurality of feeders, including a selected feeder, for supplying power from said supply circuit to said load circuit; a feeder circuit breaker operable from an open position to a closed position to connect said feeder to said supply circuit; a circuit interrupter for connecting said feeder to said load circuit; an arc oscillator for supplying carrier currents to said selected feeder, said arc oscillator being designed to oscillate in response to a predetermined voltage condition derived from said selected feeder; means effective when said feeder circuit breaker is in a predetermined position for connecting said arc-oscillator to respond to said predetermined voltage condition; and control means responsive to said carrier currents for operating said circuit interrupter to a position corresponding to said predetermined position.

22. In an alternating-current system of transmission and distribution, a load circuit; a supply circuit; a plurality of feeders, including a selected feeder, for supplying power from said supply circuit to said load circuit; a feeder circuit breaker for connecting said feeder to said supply circuit; a circuit interrupter for connecting said feeder to said load circuit; an arc-oscillator for supplying carrier currents to said selected feeder, said arc-oscillator being designed to oscillate in response to a predetermined voltage condition derived from said selected feeder; means effective when said feeder circuit breaker is open for connecting said arc-oscillator to respond to said predetermined voltage condition; and means responsive to said carrier currents for causing said circuit interrupter to open.

23. In an alternating-current network system of distribution, a polyphase network load circuit; a polyphase supply circuit; a plurality of polyphase feeders including a selected feeder for supplying power from said supply circuit to said load circuit; a plurality of arc-oscillators for supplying carrier currents to said selected feeder, said arc-oscillators being designed to oscillate in response to a predetermined voltage condition derived from said selected feeder; means effective when said feeder circuit breaker is open for connecting said arc-oscillators to respond to said predetermined voltage condition; a network circuit breaker for connecting said feeder to said load circuit; and means responsive to said carrier currents for causing said network circuit breaker to open.

24. In an alternating-current network system of distribution, a polyphase network load circuit; a polyphase grounded-neutral supply circuit; a plurality of polyphase feeders including a selected feeder for supplying power from said supply circuit to said load circuit; an arc-oscillator for each phase conductor of said selected feeder for supplying carrier currents thereto, said arc-oscillators being designed to oscillate in response to the corresponding phase-to-ground voltage of said selected feeder; means effective when said feeder circuit breaker is open for connecting said arc oscillators to respond to the phase-to-ground voltages of said selected feeder; a network circuit breaker for connecting said feeder to said load circuit; and means responsive to said carrier currents for causing said network circuit breaker to open.

25. In an alternating-current network system of distribution, a network load circuit; a supply circuit; a feeder for supplying power from said supply circuit to said load circuit; a feeder circuit breaker for connecting said feeder to said supply circuit; a transformer connecting said feeder to said load circuit; a net-work circuit-breaker for controlling the power flow through said transformer; tripping means responsive to a high-frequency current condition produced by an arc on said feeder for causing said network circuit breaker to open; and means responsive to opening of said feeder circuit breaker for artificially establishing a high-frequency current condition on said feeder such as to cause operation of said tripping means.

26. In an alternating-current network system of distribution, a network load circuit; a supply circuit; a feeder for supplying power from said supply circuit to said load circuit; a feeder circuit breaker for connecting said feeder to said supply circuit; a transformer connecting said feeder to said load circuit; a network circuit breaker for controlling the power flow through said transformer; tripping means responsive to a predetermined band of high-frequency currents produced by an arc on said feeder for causing said network circuit breaker to open; and means responsive to opening of said feeder circuit breaker for artificially producing high-frequency currents on said feeder of frequency within said band.

27. In an alternating-current network system of distribution, a network load circuit; a supply circuit; a feeder for supplying power from said supply circuit to said load circuit; a feeder circuit breaker for connecting said feeder to said supply circuit; a transformer connecting said feeder to said load circuit; a network circuit breaker for controlling the power flow through said transformer; tripping means responsive to a predetermined band of high-frequency currents produced by an arc on said feeder for causing said network circuit breaker to open, an arc-oscillator at said supply station tuned to a frequency within said band; and means responsive to opening of said feeder circuit breaker for connecting said arc-oscillator to said feeder.

28. In an alternating-current network system of distribution, a polyphase network load circuit; a polyphase grounded neutral supply circuit, a polyphase feeder for supplying power from said supply circuit to said load circuit; a feeder circuit breaker for connecting said feeder to said supply circuit; polyphase transformer means connecting said feeder to said load circuit; a network circuit breaker for controlling the power flow through said transformer means; tripping means responsive to a high-frequency current condition produced by an arc on said feeder for causing said network circuit breaker to open; an arc-oscillator for each phase conductor of said feeder for producing a high-frequency current condition of said feeder such as to cause operation of said tripping means, said arc oscillators being designed to oscillate in response to the corresponding phase-to-ground voltage of said feeder; and means effective when said feeder circuit breaker is open for connecting said arc-oscillators to respond to the phase-to-ground voltages of said feeder.

JOHN S. PARSONS.
GEORGE O. HARRISON.